United States Patent
Brailovskiy et al.

(10) Patent No.: US 9,729,889 B2
(45) Date of Patent: Aug. 8, 2017

(54) MULTI-PASS QUANTIZATION AND BIT PACKING CONTROL FOR VIDEO

(75) Inventors: Ilya Brailovskiy, Palo Alto, CA (US); Timofei Kulakov, Moscow (RU)

(73) Assignee: Intel Corporation, Santa Clara, CA (US)

( * ) Notice: Subject to any disclaimer, the term of this patent is extended or adjusted under 35 U.S.C. 154(b) by 772 days.

(21) Appl. No.: 13/538,648

(22) Filed: Jun. 29, 2012

(65) Prior Publication Data

US 2014/0003500 A1 Jan. 2, 2014

(51) Int. Cl.
*H04N 19/192* (2014.01)
*H04N 19/176* (2014.01)
*H04N 19/15* (2014.01)
*H04N 19/61* (2014.01)
*H04N 19/126* (2014.01)

(52) U.S. Cl.
CPC ......... *H04N 19/192* (2014.11); *H04N 19/126* (2014.11); *H04N 19/15* (2014.11); *H04N 19/176* (2014.11); *H04N 19/61* (2014.11)

(58) Field of Classification Search
CPC ......... H04N 7/26159; H04N 21/23655; H04N 21/2662
See application file for complete search history.

(56) References Cited

U.S. PATENT DOCUMENTS

| | | | |
|---|---|---|---|
| 6,614,942 B1* | 9/2003 | Meier | 382/251 |
| 7,391,809 B2* | 6/2008 | Li et al. | 375/240.12 |
| 8,631,451 B2* | 1/2014 | Bennett et al. | 725/105 |
| 2005/0147163 A1 | 7/2005 | Li et al. | |
| 2006/0026302 A1 | 2/2006 | Bennett et al. | |

FOREIGN PATENT DOCUMENTS

| | | |
|---|---|---|
| CN | 1393109 A | 1/2003 |
| CN | 1992890 A | 7/2007 |
| CN | 102172020 A | 8/2011 |

OTHER PUBLICATIONS

Office Action received for Chinese Patent Application No. 201310267763.8, mailed on Feb. 3, 2016, 12 pages of Chinese Office Action only.
Office Action received for Chinese Patent Application No. 201310267763.8, mailed on Oct. 10, 2016, 14 pages of Chinese Office Action only.

* cited by examiner

*Primary Examiner* — Christopher Findley
(74) *Attorney, Agent, or Firm* — Schiff Hardin LLP (57) ABSTRACT

Described herein are techniques related to multi-pass quantization and bit-packing (PAK) parameters algorithm in video encoding.

30 Claims, 6 Drawing Sheets

MULTI-PASS QUANTIZATION AND BIT PACKING CONTROL FOR VIDEO

BACKGROUND

Video coding is a process of preparing video (video data), where the video is encoded to meet proper formats and specifications for recording and playback. Motion estimation is an important and computationally intensive task in video coding and video compression.

The Video Coding Experts Group (VCEG), together with the International Organization for Standardization (ISO)/ International Electro-technical Commission (IEC) joint working group, the Moving Picture Experts Group (MPEG), has developed the Advanced Video Coding (AVC) standard. The AVC standard, or AVC, is also known as H.264. The AVC standard is an example of a standard for video encoding, and is one of the most commonly used formats for the recording, compression, and distribution of high definition video. Other standards include and are not limited to, Motion Pictures Experts Group 2 (MPEG2), Scalable Video Coding (SVC), and High Efficiency Video Coding (HEVC), etc.

In a traditional video encoding systems, when an encoded frame exceeds a maximal frame size, the encoder re-encodes the entire frame, dynamically changing quantization parameters (QPs) for each re-encoding pass and repeating this process as many steps as needed. To this end, a software/ hardware solution may be implemented to increase quality and performance encoding altogether.

The following Detailed Description is provided with reference to the accompanying figures. In the figures, the left-most digit(s) of a reference number usually identifies the figure in which the reference number first appears. The use of the same reference numbers in different figures indicates similar or identical items.

DETAILED DESCRIPTION

This document discloses one or more systems, apparatuses, methods, etc. for implementing a multi-pass quantization and bit-packing (PAK) parameters algorithm to achieve a user specified target frame size prior to bit-rate transmission by a PAK hardware (HW) component. In an implementation, the multi-pass PAK parameters algorithm is performed separately from the PAK hardware (HW) component that implements the bit-rate transmission for a current image frame. For example, the multi-pass PAK parameters algorithm may receive parameters from a bit rate control (BRC) component. The parameters may include the user specified target frame size, a calculated quantization parameter (QP), an estimated QP, a calculated current frame size, historical data, current frame type, current frame encoding approach, etc. for the current image frame. In an implementation, the multi-pass PAK parameters algorithm may perform at least one or more iterations to determine a mismatch between the (user specified) target frame size and the calculated current frame size. For example, the mismatch may provide a corresponding equivalent for a QP delta parameter that is based on the determined mismatch. In this example, the at least one or more iterations applies the corresponding equivalent or value of the QP delta on entire current image frame until the target frame size is obtained. In other implementations, the at least one or more iterations is configured to include a maximum number of passes for each frame type (e.g., intra (I) frame, a predictive (P) frame, and/or a bidirectional (B) frame types). For example, the at least one or more iterations is performed between 3 to 7 number of times depending upon the frame type.

In an implementation, the PAK HW component may utilize output parameters of the multi-pass PAK parameters algorithm for the bit-rate transmission that includes final quantization and bit-packing engine. In this implementation, the output parameters may include historical data, maximum frame size, final QP, estimated QP, statistics, coefficients and other variables for the current image frame. Furthermore, the PAK HW component may receive from a mode decision component I, P and/or B frame encoding approaches for the current image frame. The I, P, and/or B frame encoding approaches determines sequence of I, P and/or B types that may be used by the hardware PAK component during the bit-rate transmission.

Figure 1:
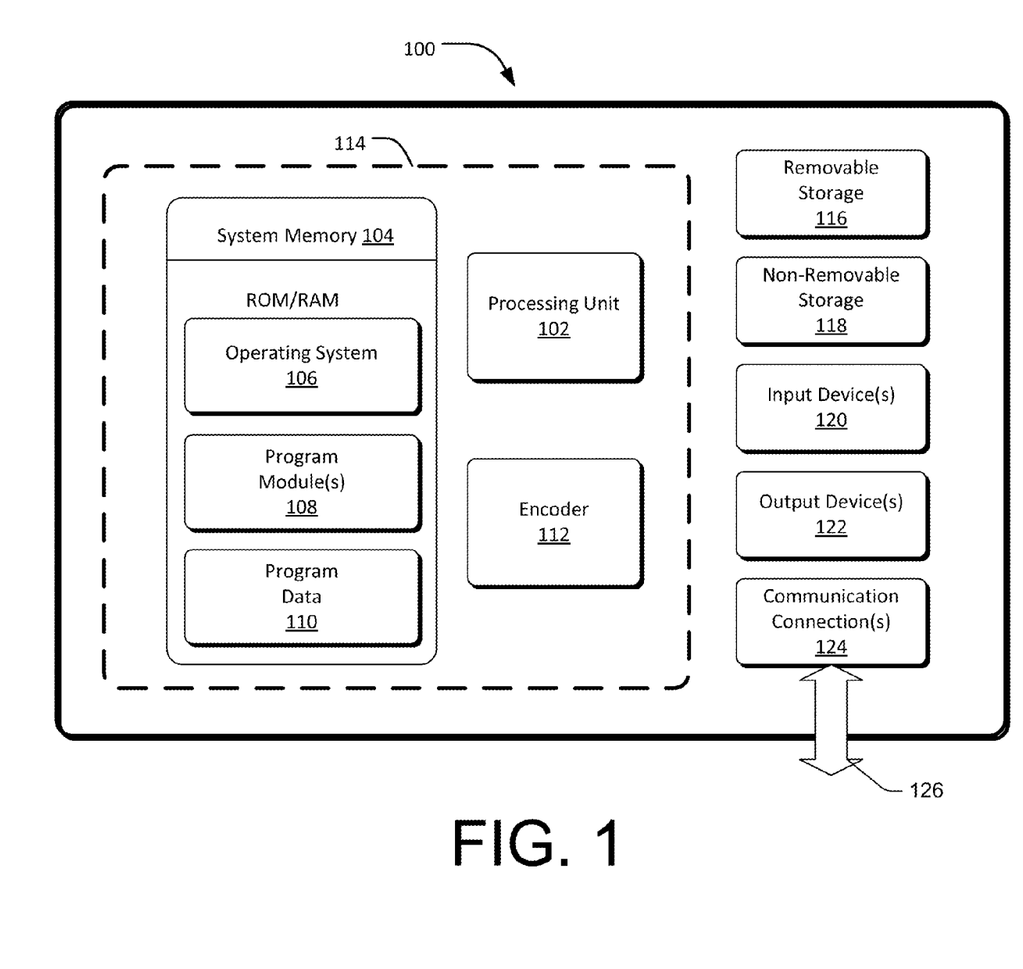
FIG. 1 is an illustrative diagram of an example system for implementing a multi-pass quantization and bit-packing (PAK) parameters algorithm during video encoding.

FIG. 1 shows an example system that may be utilized to implement various described embodiments. However, it will be readily appreciated that the techniques disclosed herein may be implemented in other computing devices, systems, and environments. The computing device 100 shown in FIG. 1 is one example of a computing device and is not intended to suggest any limitation as to the scope of use or functionality of the computer and network architectures.

In at least one implementation, computing device 100 includes at least one processing unit 102 and system memory 104. Depending on the exact configuration and type of computing device, system memory 104 may be volatile (such as RAM), non-volatile (such as ROM, flash memory, etc.) or some combination thereof. System memory 104 may include an operating system 106, one or more program modules 108, that in certain implementations may implement the multi-pass PAK parameters algorithm methods and techniques describe herein. System memory 104 may further include program data 110 which may include macro blocks/ shapes database(s) as described later in this document. Furthermore, an encoder 112 is included in this example. The encoder 112 may be used to implement video encoding, bit-packing, etc. as describe herein. The encoder 112 may be operatively coupled to and communicate with processing unit 102, system memory 104, and other memory, input/ output, devices, further described herein, and other components/devices not shown. A basic implementation of the computing device 100 is demarcated by a dashed line 114. For example, in certain implementations, encoder 112 may be part of an integrated graphics chip set of a central processing units (CPU) that includes 3D and media, having media functionality that includes video, specifically video decode/encode. In certain implementations, an application specific integrated circuit or ASIC may include the encoder 112 as a fixed function encoder.

It is contemplated that devices with video encoding may make use of the techniques, methods, and devices described. Examples of such devices include media players, video conferencing devices, etc.

In certain implementations, program modules 108 may include specific modules (not shown) such as a codec or software/firmware based encoder, configured to implement the video encoding techniques and methods described herein. For example, such modules in certain implementations may perform the processes of encoder 112. Example codecs include AVC, VC1, and SVC.

Computing device 100 may have additional features or functionality. For example, computing device 100 may also include additional data storage devices such as removable storage 116 and non-removable storage 118. In certain implementations, the removable storage 116 and non-removable storage 118 are an example of computer accessible media for storing instructions that are executable by the processing unit 102 to perform the various functions described above. Generally, any of the functions described with reference to the figures may be implemented using software, hardware (e.g., fixed logic circuitry) or a combination of these implementations. Program code may be stored in one or more computer accessible media or other computer-readable storage devices. Thus, the processes and components described herein may be implemented by a computer program product. As mentioned above, computer accessible media includes volatile and non-volatile, removable and non-removable media implemented in any method or technology for storage of information, such as computer readable instructions, data structures, program modules, or other data. The terms "computer accessible medium" and "computer accessible media" refer to non-transitory storage devices and include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium that may be used to store information for access by a computing device, e.g., computing device 100. Any of such computer accessible media may be part of the computing device 100.

In one implementation, the removable storage 116, which is a computer accessible medium, has a set of instructions stored thereon. When executed by the processing unit 102, the set of instructions cause the processing unit 102 to execute operations, tasks, functions and/or methods as described herein, and any variations thereof.

Computing device 100 may also include one or more input devices 120 such as keyboard, mouse, pen, voice input device, touch input device, etc. Computing device 100 may additionally include one or more output devices 122 such as a display, speakers, printer, etc.

Computing device 100 may also include one or more communication connections 124 that allow the computing device 100 to communicate by wire or wirelessly with one or more other devices (not shown), over connection 126. It is appreciated that the illustrated computing device 100 is one example of a suitable device and is not intended to suggest any limitation as to the scope of use or functionality of the various embodiments described.

Figure 2:
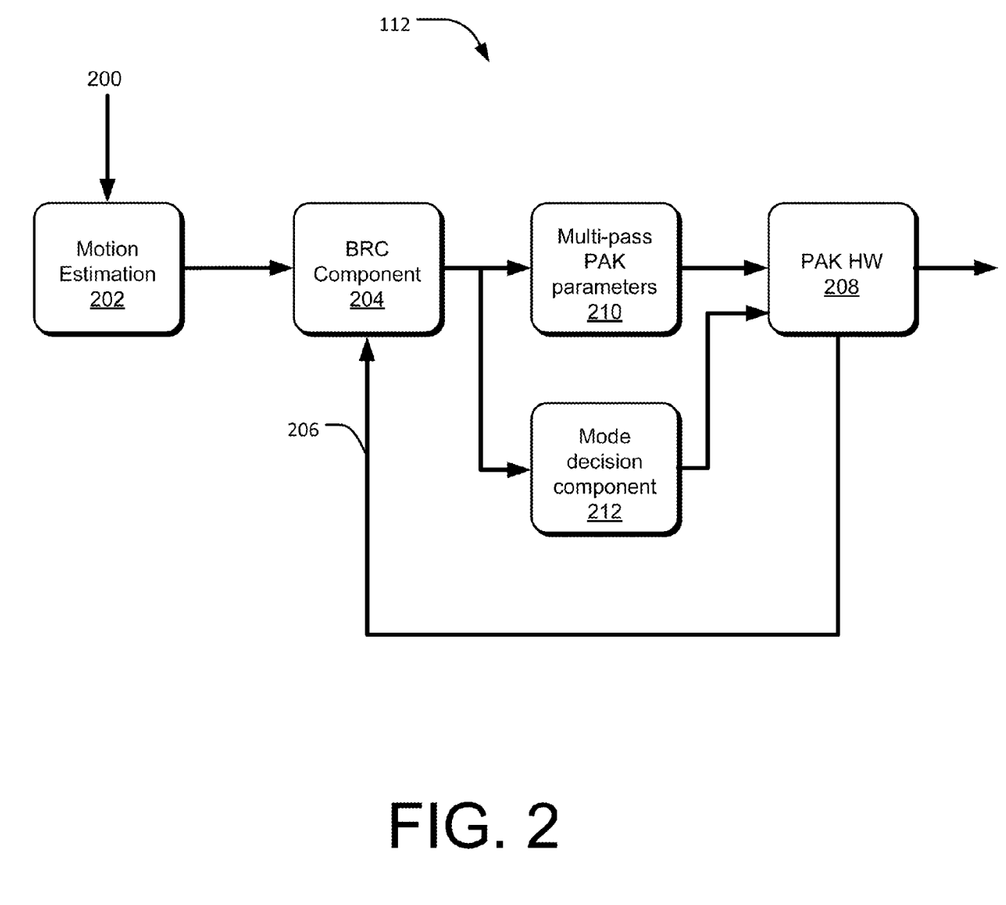
FIG. 2 an illustrative diagram of an example video encoder for implementing a multi-pass quantization and bit-packing (PAK) parameters algorithm to achieve a user specified target frame size prior to bit-rate transmission by a PAK hardware (HW) component.

FIG. 2 shows an example video encoder 112 that implements the multi-pass PAK parameters algorithm to achieve target frame size during a video compression. In this implementation, the multi-pass PAK parameters algorithm may allow high quality and high performance encoding during the video compression. In certain implementations, the video encoder 112 may be implemented as part of a central processing unit, part of integrated circuit chipset, or be a separate component/device. As discussed above, in certain implementations, the video encoder 112 may be implemented as firmware or software, such as a codec. Furthermore, FIG. 2 is merely illustrative and may contain additional blocks or components and/or different arrangement of the blocks or components.

In an implementation, the video encoder 112 may receive from video input 200 image frames that are to be encoded to generate corresponding encoded frames in the form of an encoded bit-stream, which includes series or combinations of I, P, and/or B streams. In this implementation, one or more blocks of the video encoder 112 may be configured to perform video encoding consistent with one or more standards such as, MPEG, H.264, etc. In an implementation, the received image frames from the video input 200 may be processed by a motion estimation component 202 for encoding of the received image frames into either I-frame (i.e., static frame) and/or inter-coded frames (i.e., P-frame or B-frame). The I frame encoding refers to an encoding approach in which macro-blocks of the image frame are represented based on the macro-blocks of the same frame (i.e., the image frame is coded without reference to any other image frame except itself). The motion estimation component 202 may use spatial compression techniques to encode the I-frame. The spatial compression techniques may be performed consistent to the standards noted above. Accordingly, the motion estimation component 202 may operate to determine correlation between macro-blocks in the image frame to generate a compressed or uncompressed representation of the macro-block for the I-frame. Furthermore, the motion estimation component 202 may generate motion vectors representing displacement between the macro-blocks in the P-frame or the B-frame, which may include reference frames in the encoding approach. The motion estimation component 202 may use previously stored image frames (not shown) as a basis for the encoding approach of the P-frame and the B-frame.

In an implementation, the motion estimation component 202 may receive user defined frame limits (e.g., user specified target frame size) that may be used for calculation of multi-pass PAK parameters, and motion estimation, and passed to a BRC component 204. The BRC component 204 receiving specific frame targets. In this implementation, the calculation of the multi-pass PAK parameters may be based upon frame level or slice level (i.e., image frame is divided into slices) of the current image frame. For example, the multi-pass PAK parameters algorithm may perform an iteration to obtain the multi-pass PAK parameters by applying the algorithm to the frame or slice level of the current image frame. The iteration may include at least one or more iteration until the user specified target size or user defined frame limit is achieved. After achieving the target frame size, the current frame may be processed for final bit-rate transmission.

In an implementation, specific frame limits may be utilized by a BRC component 204 to calculate the QP and/or to calculate current frame size boundaries (e.g., HRD frame size boundaries) of the image frame. Furthermore, the BRC component 204 may receive additional data such as, historical data, current frame type, final QP, coefficients, statistics, and the like, from a feedback loop 206. For example, the feedback loop 206 may include previous frame statistics, frame sizes, final QP, and other coefficients and/or variables that were utilized and/or implemented by a PAK HW component 208 during the bit-rate transmission for the current image frame. In an implementation, the PAK HW component 208 may perform the bit-rate transmission based on a separate, independent and single pass.

In an implementation, the BRC component 204 may supply parameters such as, the calculated QP, calculated frame size, current frame type, hypothetical reference decoder (HRD) maximum and minimum frame sizes, historical data, bit-rate, frame complexity estimation, etc. to a multi-pass PAK parameters component 210. Furthermore, the multi-pass PAK parameters component 210 may receive user specific inputs such as the target frame size for calculating the multi-pass PAK parameters. In an implementation, the multi-pass PAK parameters component 210 may implement the multi-pass PAK parameters algorithm iterations to compute a mismatch between the target frame size and the obtained frame size as a result of encoding, of the image frame. In this implementation, the iterations may be continuously executed until the target frame size is obtained. For example, for a given calculated mismatch, the QP for the current frame size is dynamically adjusted and applied (frame or slice level) by the multi-pass PAK parameters component 210 for next set of iteration. In this example, look-up tables may be configured for the implementation of the multi-pass PAK parameters algorithm iterations.

In an implementation, at least one or more of following Pseudo code or equation may be used by the multi-pass PAK parameters algorithm to calculate the multi-pass PAK parameters. The Pseudo code or equation may include:

$$\text{Max Frame Size} = \text{coefficient}^1 * \text{bits\_per\_frame}; \quad (1)$$

$$\text{Max Frame Size} = \text{Min}(\text{Max Frame Size}, \text{HRD\_max\_frame} - \text{delta}); \quad (2)$$

$$\text{Max Frame Size} = \text{Min}(\text{Max Frame Size}, \text{User Max Frame}); \quad (3)$$

$$\text{Max\_Delta} = \text{const}^2 * (\text{Max Frame Size} - \text{Target Frame Size}); \quad (4)$$

IF(Target Frame Size>=Max Frame Size)THEN follow Eq. 6,7 or 8; (5)

$$\text{Est\_QP} = (\text{previous QP} * \text{previous frame size}) \div \text{Max Frame Size} \quad (6)$$

$$\text{tmp\_qp} = \text{Max}(\text{const1}, \text{abs}(\text{Est\_QP} - \text{new\_QP})) \quad (7)$$

$$\text{QpAdj}[\text{range index}] = \text{MAX}(\text{const}(\text{range index}), f(\text{tmp\_qp}, \text{iteration number}, \text{range index})) \quad (8)$$

IF(Target Frame Size<Max Frame Size)THEN follow Eq. 10 and/or 11; (9)

tmp_qp is selected from a look_up table depending on QP value from the BRC component 204 e.g., tmp_qp is bigger for higher QPs; (10)

$$\text{QpAdj}[\text{range index}] = \text{MAX}(\text{const}(\text{range index}), f(\text{tmp\_qp}, \text{iteration number}, \text{range index})) \quad (11)$$

Where:
  1—is found from a look up table and may include a range of 3 to 12 depending upon frame type e.g., I, P or B frame type;
  HRD_max_frame—is calculated by BRC component 204 for the current frame;
  delta—is a "safety blanket" that includes a fixed value (e.g., 256 bytes) or 2% of HRD_max_frame;
  User Max Frame—is a user specified maximum frame size;
  2—includes a range of 3 to 32 depending on encoding settings such as:
    a) User setting as to how strictly frame size should be enforced;
    b) Frame complexity e.g., the higher the complexity, the lower the const; and
    c) QP range e.g., bigger $\text{const}^2$ values for lower QPs;
  "const" and "f"—are empirically defined look up tables with following property:
  The bigger the range number–the bigger the value, the bigger iteration number, the smaller values. For example, f (tmp_qp, range index)=tmp_qp>>(6−range index)Const={1,2,3,6};
  Max—maximum; Min—minimum; Est.—estimated; tmp—temporary
  HRD—hypothetical reference decoder
  Eq. 5 and Eq. 9—adopts loop over all PAK iterations from 0 to max number of iterations (i.e., variable iteration number); and loop thru ranges from 0 to max number ranges (i.e., variable range index).

In an implementation, the equations described above may include coefficients and/or variables that are reset once the target frame size is obtained. In other words, for a next image frame to be processed, the multi-pass PAK parameters component 210 may utilize another set of data for calculating the multi-pass PAK parameter. For example, the QP may be reset to its initial value; the historical data is reset to a new value for next set of iteration, etc.

In an implementation, a mode decision component 212 may decide sequence of I, P, and/or B frames encoding approaches that may be used by the PAK hardware component 208. In this example, the PAK hardware component 208 may integrate signals received from the multi-pass PAK component 210 for the bit-rate transmission of the current image frame. The signals received may include the multi-pass PAK parameters as calculated above. In an implementation, the final QP, current frame types, etc. that was used in the bit-rate transmission is fed back to the BRC component 204 through the feedback loop 206. For example, the historical data may include different frame types that were previously stored for purposes of performing calculations by the BRC component 204.

Figure 3:
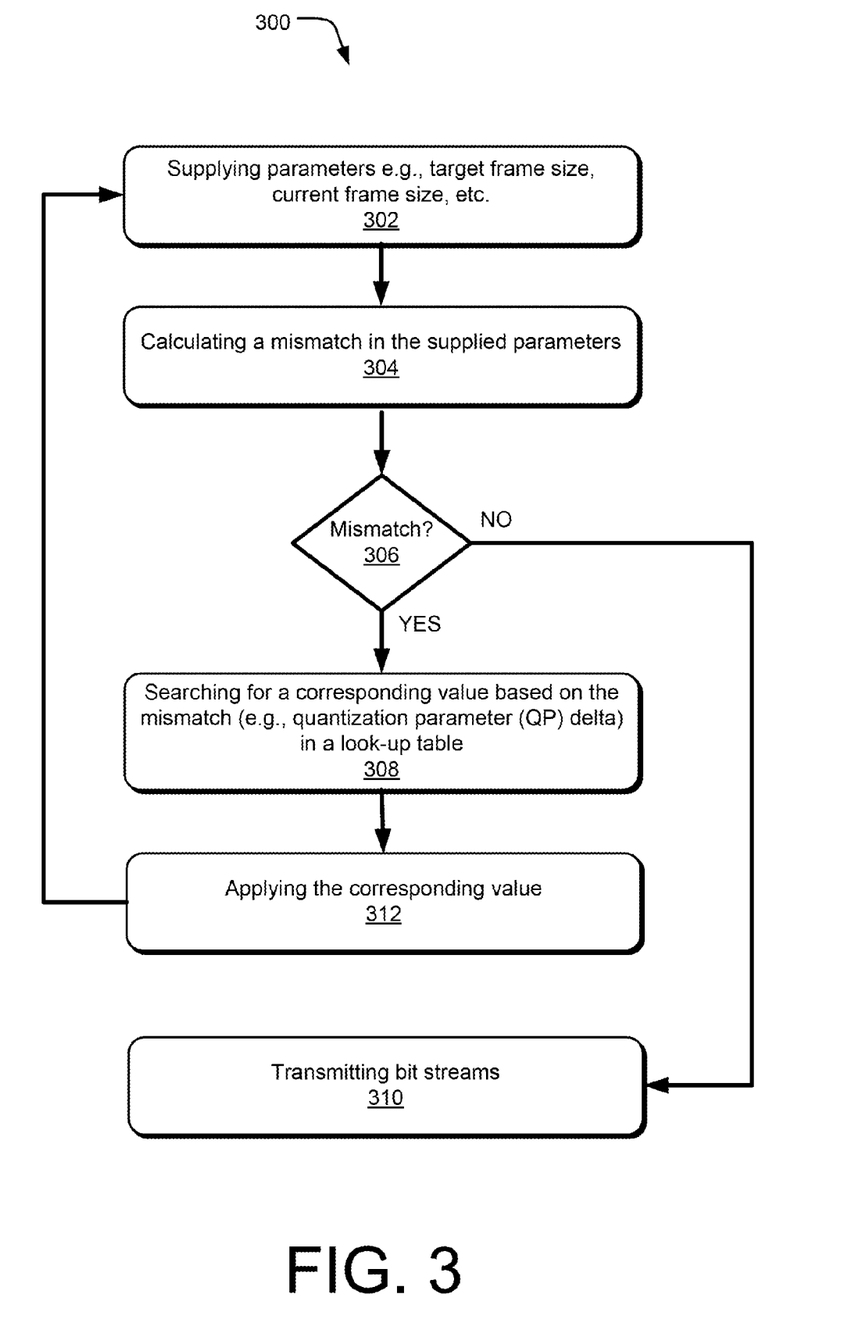
FIG. 3 an illustrative diagram of an example method for implementing a multi-pass quantization and bit-packing (PAK) parameters algorithm to achieve a user specified target frame size prior to bit-rate transmission by a PAK hardware (HW) component.

FIG. 3 shows an example process flowchart 300 illustrating an example method for implementing the multi-pass PAK parameters algorithm to achieve target frame size for a current image frame prior to bit-rate transmission by a PAK HW component. The order in which the method is described is not intended to be construed as a limitation, and any number of the described method blocks can be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At block 302, receiving parameters is performed. In an implementation, a BRC component (e.g., BRC component 204) may supply the parameters that are used by a multi-pass PAK parameters component (e.g., multi-pass PAK parameters component 210) in implementing the multi-pass PAK parameters algorithm for the current image frame. For example, the supplied parameters may include historical data, (user specified) target frame size, calculated current frame size, maximum frame size, minimum frame size, final QP, estimated QP, corresponding value from a look-up table of QP delta, statistics and/or coefficients that are used in the multi-pass PAK parameters algorithm.

At block 304, calculating a mismatch in the parameters is performed. In an implementation, the multi-pass PAK parameters component 210 may perform at least one or more iterations to achieve the target frame size. For example, the multi-pass PAK parameters component 210 calculates the mismatch between target frame size parameter and the current frame size parameter. In this example, the target frame size parameter may include the user specified target frame size while the current frame size parameter is calculated by the BRC component 204.

At block 306, determining mismatch presence is performed. In an implementation, the multi-pass PAK parameters component 210 determines the mismatch presence by calculating difference between the target frame size and the current frame size of the current image frame. In case of mismatch presence, then following YES at block 308, a corresponding value depending upon amount of the calculated mismatch is searched. For example, the corresponding value may be found in a dynamic look-up table for a particular QP delta that is based on the calculated mismatch. Furthermore, the number of PAK passes and the values in the dynamic look up table may be pre-calculated upfront before iterating thru PAK passes.

In the absence of mismatch, then following NO at block 310, transmitting bit streams is performed separately by the PAK HW component (e.g., PAK HW component 208). In an implementation, transmitting bit streams may be performed in a single passing and is independent from at least one or more iterations to be performed by the multi-pass PAK parameters algorithm. For example, the PAK HW component may integrate final value of the parameters that are derived after final and last iteration performed by the multi-pass PAK parameters algorithm.

At block 312, applying the corresponding value to the current frame size is performed. In an implementation, the multi-pass PAK parameters component 210 may perform the at least one or more iterations to correct the mismatch in the parameters. For example, the corresponding value for the calculated mismatch (i.e., QP delta equivalent in the look-up table) is applied by the multi-pass PAK parameters algorithm to an entire frame or slice level of the current frame size in order to eliminate the mismatch. In this example, the at least one or more iteration performs re-encoding of the current frame time in case of mismatch presence. Furthermore, newly estimated QP, final QP, other historical data, coefficients, and other variables for the current image frame is fed back to the block 302 for next set of iteration.

In an implementation, a mode decision component (e.g., mode decision component 212) may provide the PAK HW component 208 sequence of I, P, and/or B frame encoding approaches during the bit stream transmission. In this example, the sequence and/or combination of the I-frame, P-frame, or B-frame encoding approaches may utilize final value of current frame size, final QP used, etc. from the multi-pass PAK parameters component 210.

In the above description of example implementations, for purposes of explanation, specific numbers, materials configurations, and other details are set forth in order to better explain the present invention, as claimed. However, it will be apparent to one skilled in the art that the claimed invention may be practiced using different details than the example ones described herein. In other instances, well-known features are omitted or simplified to clarify the description of the example implementations.

The inventors intend the described example implementations to be primarily examples. The inventors do not intend these example implementations to limit the scope of the appended claims. Rather, the inventors have contemplated that the claimed invention might also be embodied and implemented in other ways, in conjunction with other present or future technologies.

As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more," unless specified otherwise or clear from context to be directed to a singular form.

These processes are illustrated as a collection of blocks in a logical flow graph, which represents a sequence of operations that may be implemented in mechanics alone or a combination with hardware, software, and/or firmware. In the context of software/firmware, the blocks represent instructions stored on one or more computer-readable storage media that, when executed by one or more processors, perform the recited operations.

Note that the order in which the processes are described is not intended to be construed as a limitation, and any number of the described process blocks may be combined in any order to implement the processes or an alternate process. Additionally, individual blocks may be deleted from the processes without departing from the spirit and scope of the subject matter described herein.

Figure 4:
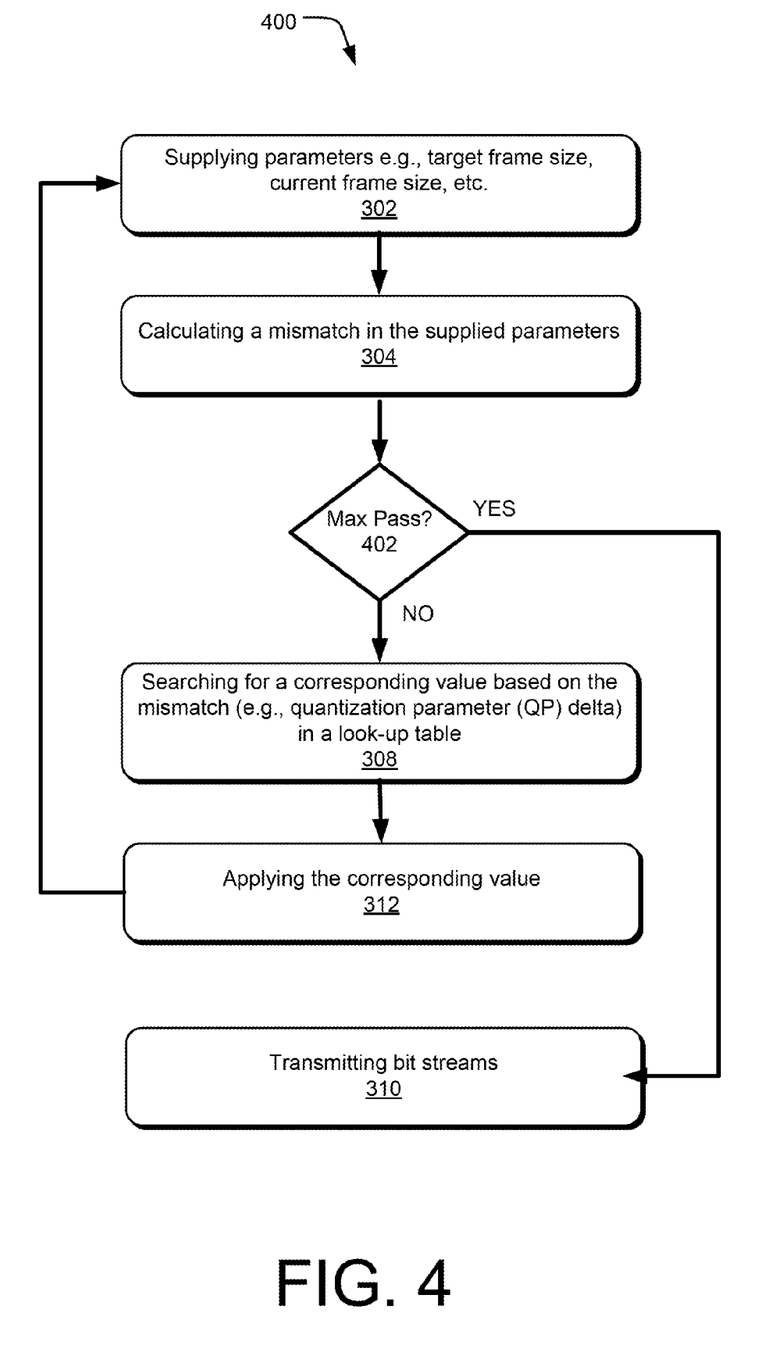
FIG. 4 an illustrative diagram of an alternate example method for implementing a multi-pass quantization and bit-packing (PAK) parameters algorithm to achieve a user specified target frame size prior to bit-rate transmission by a PAK hardware (HW) component.

FIG. 4 shows an example process flowchart 400 illustrating another example method for implementing the multi-pass PAK parameters algorithm to achieve target frame size for a current image frame prior to bit-rate transmission by a PAK HW component. The order in which the method is described is not intended to be construed as a limitation, and any number of the described method blocks can be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

In an implementation, block 402 includes determining if a maximum pass for a particular frame type is obtained. For example, the multi-pass PAK parameters algorithm performs the at least one or more iteration for a given threshold number of the maximum pass for the particular frame type e.g., I, P, or B frame type. In this example, the threshold number may include a value of between 3 to 7 depending upon the particular frame type. With regard to rest of the blocks in FIG. 4, the same principle and functions as described and discussed in FIG. 3 are applied to the rest of the blocks of the FIG. 4.

Figure 5:
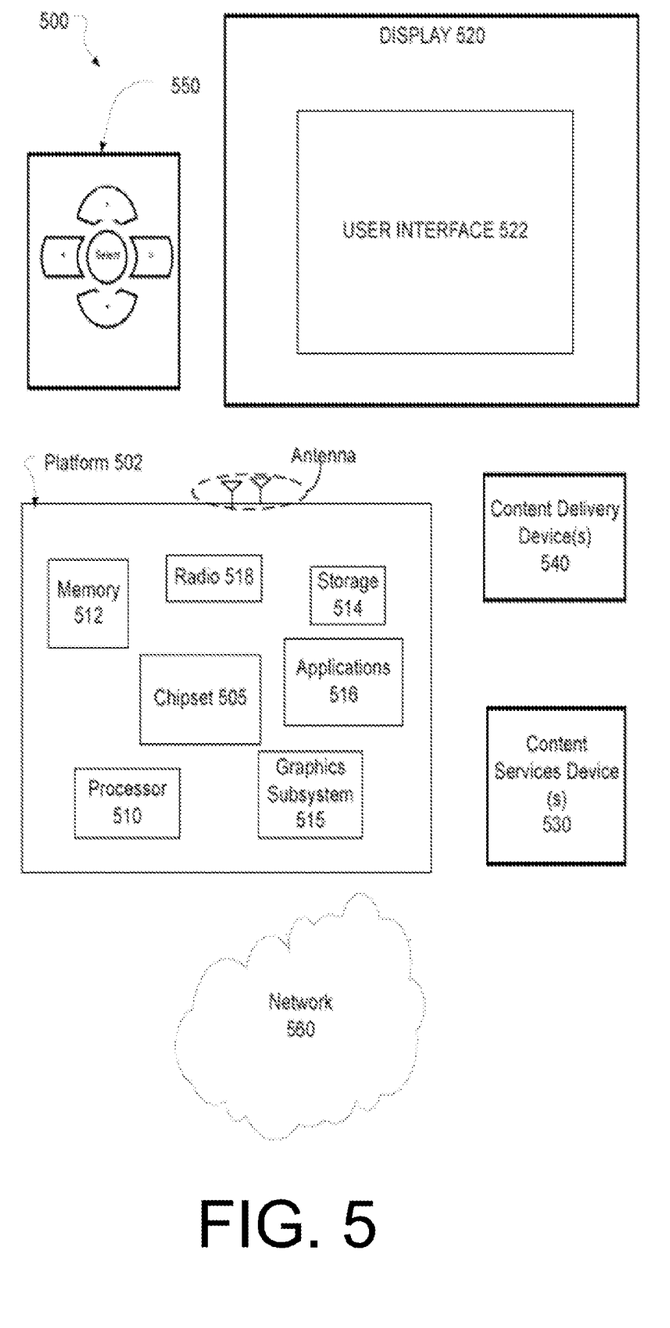
FIG. 5 is an illustrative diagram of an example system that implements multi-pass quantization and bit packing control for video

FIG. 5 illustrates another example system 500 in accordance with the present disclosure. In various implementations, system 500 may be a media system although system 500 is not limited to this context. For example, system 500 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In various implementations, system 500 includes a platform 502 coupled to a display 520. Platform 502 may receive content from a content device such as content services device(s) 530 or content delivery device(s) 540 or other similar content sources. A navigation controller 550 including one or more navigation features may be used to interact with, for example, platform 502 and/or display 520. Each of these components is described in greater detail below.

In various implementations, platform 502 may include any combination of a chipset 505, processor 510, memory 512, storage 514, graphics subsystem 515, applications 516 and/or radio 518. Chipset 505 may provide intercommunication among processor 510, memory 512, storage 514, graphics subsystem 515, applications 516 and/or radio 518. For example, chipset 505 may include a storage adapter (not depicted) capable of providing intercommunication with storage 514.

Processor 510 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 510 may be dual-core processor(s), dual-core mobile processor(s), and so forth.

Memory 512 may be implemented as a volatile memory device such as, but not limited to, a Random Access Memory (RAM), Dynamic Random Access Memory (DRAM), or Static RAM (SRAM).

Storage 514 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 514 may include technology to increase the storage performance enhanced protection for valuable digital media when multiple hard drives are included, for example.

Graphics subsystem 515 may perform processing of images such as still or video for display. Graphics subsystem 515 may be a graphics processing unit (GPU) or a visual processing unit (VPU), for example. An analog or digital interface may be used to communicatively couple graphics subsystem 515 and display 520. For example, the interface may be any of a High-Definition Multimedia Interface, DisplayPort, wireless HDMI, and/or wireless HD compliant techniques. Graphics subsystem 515 may be integrated into processor 510 or chipset 505. In some implementations, graphics subsystem 515 may be a stand-alone card communicatively coupled to chipset 505.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 518 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 518 may operate in accordance with one or more applicable standards in any version.

In various implementations, display 520 may include any television type monitor or display. Display 520 may include, for example, a computer display screen, touch screen display, video monitor, television-like device, and/or a television. Display 520 may be digital and/or analog. In various implementations, display 520 may be a holographic display. Also, display 520 may be a transparent surface that may receive a visual projection. Such projections may convey various forms of information, images, and/or objects. For example, such projections may be a visual overlay for a mobile augmented reality (MAR) application. Under the control of one or more software applications 516, platform 502 may display user interface 522 on display 520.

In various implementations, content services device(s) 530 may be hosted by any national, international and/or independent service and thus accessible to platform 502 via the Internet, for example. Content services device(s) 530 may be coupled to platform 502 and/or to display 520. Platform 502 and/or content services device(s) 530 may be coupled to a network 560 to communicate (e.g., send and/or receive) media information to and from network 560. Content delivery device(s) 540 also may be coupled to platform 502 and/or to display 520.

In various implementations, content services device(s) 530 may include a cable television box, personal computer, network, telephone, Internet enabled devices or appliance capable of delivering digital information and/or content, and any other similar device capable of unidirectionally or bidirectionally communicating content between content providers and platform 502 and/display 520, via network 560 or directly. It will be appreciated that the content may be communicated unidirectionally and/or bidirectionally to and from any one of the components in system 500 and a content provider via network 560. Examples of content may include any media information including, for example, video, music, medical and gaming information, and so forth.

Content services device(s) 530 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 502 may receive control signals from navigation controller 550 having one or more navigation features. The navigation features of controller 550 may be used to interact with user interface 522, for example. In embodiments, navigation controller 550 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 550 may be replicated on a display (e.g., display 520) by movements of a pointer, cursor, focus ring, or other visual indicators displayed on the display. For example, under the control of software applications 516, the navigation features located on navigation controller 550 may be mapped to virtual navigation features displayed on user interface 522, for example. In embodiments, controller 550 may not be a separate component but may be integrated into platform 502 and/or display 520. The present disclosure, however, is not limited to the elements or in the context shown or described herein.

In various implementations, drivers (not shown) may include technology to enable users to instantly turn on and off platform 502 like a television with the touch of a button after initial boot-up, when enabled, for example. Program logic may allow platform 502 to stream content to media adaptors or other content services device(s) 530 or content delivery device(s) 540 even when the platform is turned "off." In addition, chipset 505 may include hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various implementations, any one or more of the components shown in system 500 may be integrated. For example, platform 502 and content services device(s) 530 may be integrated, or platform 502 and content delivery device(s) 540 may be integrated, or platform 502, content services device(s) 530, and content delivery device(s) 540 may be integrated, for example. In various embodiments, platform 502 and display 520 may be an integrated unit. Display 520 and content service device(s) 530 may be integrated, or display 520 and content delivery device(s) 540 may be integrated, for example. These examples are not meant to limit the present disclosure.

In various embodiments, system 500 may be implemented as a wireless system, a wired system, or a combination of both. When implemented as a wireless system, system 500 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 500 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 502 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 5.

Figure 6:
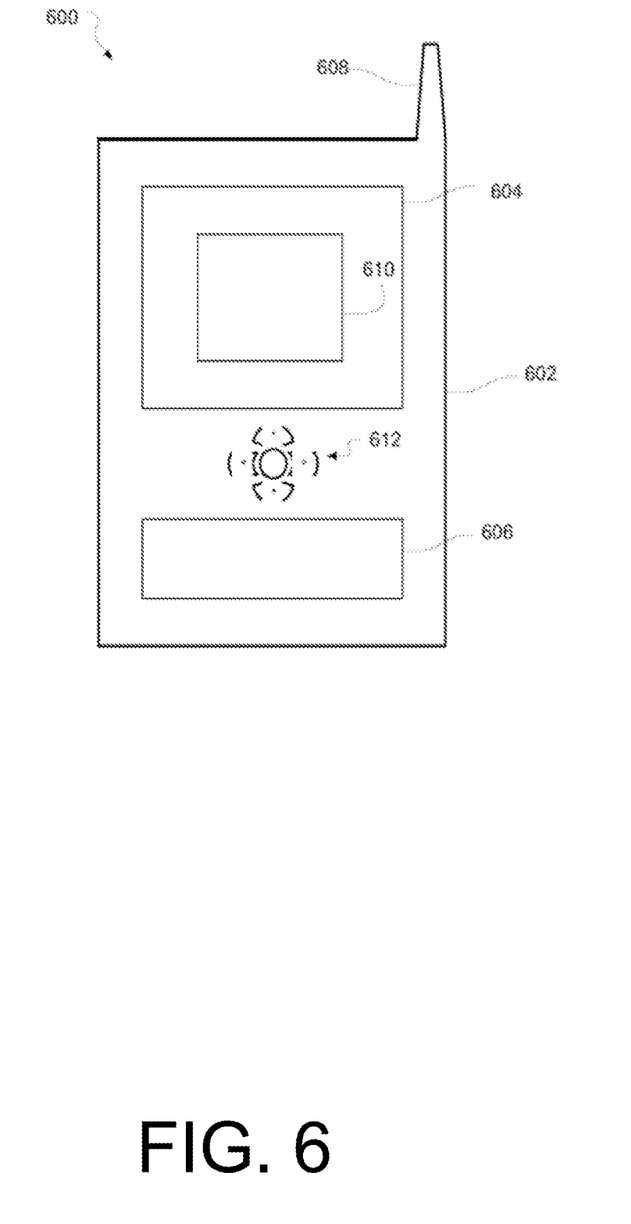
FIG. 6 is an illustrative diagram of an example device, all arranged in accordance with at least some implementations of present disclosure.

As described above, system 500 may be embodied in varying physical styles or form factors. FIG. 6 illustrates implementations of a small form factor device 600 in which system 500 may be embodied. In embodiments, for example, device 600 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 6, device 600 may include a housing 602, a display 604, an input/output (I/O) device 606, and an antenna 608. Device 600 also may include navigation features 612. Display 604 may include any suitable display unit for displaying information appropriate for a mobile computing device. I/O device 606 may include any suitable I/O device for entering information into a mobile computing device. Examples for I/O device 606 may include an alphanumeric keyboard, a numeric keypad, a touch pad, input keys, buttons, switches, rocker switches, microphones, speakers, voice recognition device and software, and so forth. Information also may be entered into device 600 by way of microphone (not shown). Such information may be digitized by a voice recognition device (not shown). The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

Realizations in accordance with the present invention have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the various configurations may be implemented as a combined structure or component. These and other variations, modifications, additions, and improvements may fall within the scope of the invention as defined in the claims that follow.

The following examples pertain to further embodiments: a video encoder that implements a multi-pass quantization and bit-packing engine (PAK) parameters algorithm comprising a bit-rate control (BRC) component that provides a calculated current frame size and a user specified target frame size of a current image frame; a multi-pass PAK parameters component that receives the calculated current frame size and a user specified target frame size of a current image frame, and calculates a mismatch between the current frame size and the target frame size, wherein the multi-pass PAK parameters component performs at least one or more iterations to achieve the target frame size for the current image frame; and a PAK hardware (HW) component to perform bit-rate transmission after achieving the target frame size.

In an implementation, a video encoder wherein the multi-pass PAK parameters component searches for a corresponding value in a look up table in case of a mismatch presence and applies the corresponding value in a frame level or slice level to the current image frame until the target frame size is achieved.

In an implementation, a video encoder wherein the multi-pass PAK parameters component performs the at least one or more iterations for a given threshold number of maximum passes that includes different values for different frame types.

In an implementation, a video encoder wherein the multi-pass PAK parameters component performs the at least one or more iterations on a frame level or slice level of the current image frame.

In an implementation, a video encoder wherein the multi-pass PAK parameters component calculates a quantization parameter (QP) delta that is used for deriving a corresponding value in a look up table, the corresponding value is applied during the at least one or more iterations.

In an implementation, a video encoder wherein the at least one or more iterations includes re-encoding of the current image frame in case of mismatch presence.

In an implementation, a video encoder wherein the PAK HW component performs bit-rate transmission in a single passing, wherein the PAK HW component is implemented separately from the at least one or more iterations.

In an implementation, a video encoder wherein the PAK HW component integrates parameters that are derived after final iteration at the multi-pass PAK parameters component with intra (I) frame, a predictive (P) frame, and/or a bidirectional (B)-frame encoding approaches.

In an implementation, a video encoder wherein the PAK HW component feeds back parameters to the BRC component, the parameters to include historical data, maximum frame size, final QP, estimated QP, statistics and coefficients of the current image frame.

In an implementation, a video encoder further comprising a mode decision component that is implemented separately from the at least one or more iterations performed by the multi-pass PAK parameters component, wherein the mode decision component provides sequence of intra (I) frame, a predictive (P) frame, and/or a bidirectional (B)-frame encoding approaches to be performed on the current image frame.

In an implementation, a device comprising one or more processors; memory configured to the processors; a video encoder configured to the processors and memory comprising: a video input to supply an image frame and a target frame size; a motion estimator component to receive the image frame for encoding; a bit-rate control (BRC) component to calculate a current frame size for the image frame; a multi-pass quantization and bit-packing engine (PAK) parameters component to calculate multi-pass PAK parameters, the calculation includes performing of at least one or more iterations until the target frame size is obtained for the image frame; and a PAK hardware (HW) component to generate encoded bit-streams representing I-frame, P-frame, and/or B-frame encoding approaches, wherein the encoded bit-streams are transmitted using the obtained target frame size for the image frame.

In an implementation, a device wherein the target frame size is a user specified target frame size.

In an implementation, a device wherein the calculation of the multi-pass PAK parameters is performed separately from the bit-streams generation by the PAK HW component.

In an implementation, a device wherein the multi-pass PAK parameters component calculates a quantization parameter (QP) delta in case of a mismatch between the target frame size and the current frame size, wherein the QP delta is applied frame level or slice level to the image frame to obtain the target frame size.

In an implementation, a device wherein the multi-pass PAK parameters component performs the at least one or more iterations for a given threshold number of maximum passes that includes different values for different frame types.

In an implementation, a device wherein the at least one or more iterations includes re-encoding of the image frame in case of mismatch presence In an implementation, a device wherein the PAK HW component performs bit-streams transmission in a single passing, wherein the PAK HW component is implemented separately from the at least one or more iterations.

In an implementation, a device wherein the PAK HW component integrates the calculated multi-pass parameters with intra (I) frame, a predictive (P) frame, and/or a bidirectional (B)-frame encoding approaches.

In an implementation, a device wherein the PAK HW component feeds back parameters to the BRC component, the parameters to include historical data, maximum frame size, final QP, estimated QP, statistics and coefficients of the image frame.

In an implementation, a device further comprising a mode decision component that is implemented separately from the at least one or more iterations performed by the multi-pass PAK parameters component, wherein the mode decision component provides sequence of intra (I) frame, a predictive (P) frame, and/or a bidirectional (B)-frame encoding approaches to be performed on the image frame.

In an implementation, a method of implementing a multi-pass quantization and bit-packing (PAK) parameters algorithm in video encoding comprising: receiving parameters that includes a target frame size and a current frame size of an image frame; calculating a mismatch in the parameters, the mismatch includes difference between the target frame size and the current frame size of the image frame; searching for a corresponding value based on the difference derived from the calculated mismatch; applying the corresponding value to the current frame size of the image frame to correct the mismatch; and transmitting bit streams for the image frame when the target frame size is obtained.

In an implementation, a method wherein the receiving parameters includes the target frame size that is a user specified target frame size while the current frame size is calculated from the image frame.

In an implementation, a method wherein the receiving parameters includes historical data, maximum frame size, final quantization parameter (QP) and/or estimated QP that are fed back from a PAK hardware (HW) component.

In an implementation, a method wherein calculating a mismatch provides a quantization parameter (QP) delta that is used as a basis for searching the corresponding value in a look up table.

In an implementation, a method wherein applying the corresponding value is performed in at least one or more iterations until the mismatch is corrected.

In an implementation, a method wherein applying the corresponding value is performed during iterations until a maximum pass for a given frame type is obtained.

In an implementation, a method wherein applying the corresponding value is performed in at least one or more iterations that includes re-encoding of the image frame in case of mismatch presence.

In an implementation, a method wherein applying the corresponding value includes applying a different quantization parameter (QP) to the current frame size.

In an implementation, a method wherein the transmitting bit streams is implemented in a single passing, the bit-streams represent sequence and/or combination of intra (I) frame, a predictive (P) frame, and/or a bidirectional (B)-frame encoding approaches.

In an implementation, a method wherein the transmitting bit-streams integrates sequence of intra (I) frame, a predictive (P) frame, and/or a bidirectional (B) frame encoding approaches with the parameters that are derived after final iteration.

What is claimed is:

1. A video encoder that implements a multi-pass quantization and bit packing engine (PAK) parameters algorithm comprising:
   a feedback loop configured to feed back a final quantization parameter (QP) and a frame statistic used on a recent bit-rate transmission;
   a bit-rate control (BRC) component configured to receive the feedback from the feedback loop, the BRC component calculates and provides a calculated QP and a calculated current frame size based from the received feedback, wherein the BRC parameter further provides a user specified target frame size of a current image frame;
   a multi-pass PAK parameters component configured to calculate a mismatch between the calculated current frame size and the user specified target frame size, wherein the multi-pass PAK parameters component applies an adjusted quantization parameter (QP) from a look-up table (LUT) based on the calculated mismatch to achieve the target frame size for the current image frame;
   a mode decision component configured to provide a sequence of intra (1) frame, a predictive (P) frame, and/or a bidirectional (B)-frame encoding approaches to be performed on the current image frame after achieving the target frame size; and
   a PAK hardware (HW) component to perform bit-rate transmission using the provided I, P, and/or B—frame encoding approaches, wherein the PAK HW component feeds back the final QP and the frame statistic through the feedback loop for a next bit-rate transmission.

2. The video encoder of claim 1 wherein the multi-pass PAK parameters component searches for a corresponding value of the QP in the LUT in case of a mismatch presence and applies the corresponding value in a frame level or slice level to the current image frame until the target frame size is achieved.

3. The video encoder of claim 1 wherein the multi-pass PAK parameters component performs one or more iterations for a given threshold number of maximum passes that includes different values for different frame types.

4. The video encoder of claim 1 wherein the multi-pass PAK parameters component performs one or more iterations on a frame level or slice level of the current image frame to correct the mismatch.

5. The video encoder of claim 1 wherein the multi-pass PAK parameters component calculates a quantization parameter (QP) delta that is used for deriving a corresponding value in the LUT, the corresponding value is applied during one or more iterations.

6. The video encoder of any of claims 1 to 5, wherein the one or more iterations includes re-encoding of the current image frame in case of mismatch presence.

7. The video encoder of any of claims 1 to 5, wherein the PAK HW component performs bit-rate transmission in a single passing, wherein the PAK HW component is implemented separately from the one or more iterations.

8. The video encoder of any of claims 1 to 5, wherein the PAK HW component integrates parameters that are derived after final iteration at the multi-pass PAK parameters component with the intra (1) frame, a predictive (P) frame, and/or a bidirectional (B)-frame encoding approaches.

9. The video encoder of any of claims 1 to 5, wherein the PAK HW component feeds back historical data, maximum frame size, estimated QP, statistics and coefficients of the current image frame.

10. The video encoder of any of claims 1 to 5 further comprising the mode decision component that is implemented separately from the one or more iterations performed by the multi-pass PAK parameters component.

11. A device comprising:
one or more processors;
memory configured to the processors;
a video encoder configured to the processors and memory comprising:
  a video input to supply an image frame and a target frame size;
  a motion estimator component to receive the Image frame for encoding;
  a feedback loop configured to feed back a final quantization parameter (QP) and a frame statistic used on a recent bit-rate transmission;
  a bit-rate control (BRC) component configured to receive the feedback from the feedback loop, the BRC component calculates and provides a calculated current frame size for the image frame based from the received feedback;
  a multi-pass quantization and bit-packing engine (PAK) parameters component to calculate multi-pass PAK parameters that includes a mismatch between the calculated current frame size and the target frame size, wherein the PAK parameters component performs at least one or more iterations of applying an adjusted quantization parameter (QP) from a look-up table (LUT) based on the calculated mismatch until the target frame size is obtained for the image frame;
  a mode decision component configured to provide a sequence of intra (1) frame, a predictive (P) frame, and/or a bidirectional (B)-frame encoding approaches to be performed on the current image frame after achieving the target frame size; and
  a PAK hardware (HW) component to generate encoded bit-streams using the I-frame, P-frame, and/or B-frame encoding approaches, wherein the PAK HW component feeds back the final QP and the frame statistic through the feedback loop for a next bit-rate transmission.

12. The device of claim 11 wherein the target frame size is a user specified target frame size.

13. The device of claim 11 wherein the calculation of the multi-pass PAK parameters is performed separately from the bit-streams generation by the PAK HW component.

14. The device of claim 11 wherein the multi-pass PAK parameters component calculates a quantization parameter (QP) delta in case of a mismatch between the target frame size and the current frame size, wherein the QP delta is applied frame level or slice level to the image frame to obtain the target frame size.

15. The device of claim 11 wherein the multi-pass PAK parameters component performs the at least one or more iterations for a given threshold number of maximum passes that includes different values for different frame types.

16. The device of any of claims 11 to 15 wherein the at least one or more iterations includes re-encoding of the image frame in case of mismatch presence.

17. The device of claim 11 wherein the PAK HW component performs bitstreams transmission in a single passing, wherein the PAK HW component is implemented separately from the at least one or more iterations.

18. The device of claim 11 wherein the PAK HW component integrates the calculated multi-pass parameters with the intra (1) frame, predictive (P) frame, and/or the bidirectional (B)-frame encoding approaches.

19. The device of claim 11 wherein the PAK HW component feeds back parameters to the BRC component, the parameters to include historical data, maximum frame size, estimated QP, statistics and coefficients of the image frame.

20. The device of any of claims 11 to 15 further comprising the mode decision component that is implemented separately from the at least one or more iterations performed by the multi-pass PAK parameters component.

21. A method of implementing a multi-pass quantization and bit-packing (PAK) parameters algorithm in video encoding comprising:
receiving parameters that includes a user specified target frame size and a frame statistic used on a recent bit-rate transmission;
calculating a current frame size based at least on the received frame statistic;
calculating a mismatch in the parameters, the mismatch includes difference between the user specified target frame size and the calculated current frame size of the image frame;
searching for a corresponding value of an adjusted quantization parameter (QP) from a look-up table (LUT) based on the difference derived from the calculated mismatch;
applying the corresponding value of the adjusted QP to the calculated current frame size of the image frame to correct the mismatch and to obtain the target frame size;
providing a sequence of intra (1) frame, a predictive (P) frame, and/or a bidirectional (B)-frame encoding approaches to be performed on the current image frame after the target frame size is obtained; and
transmitting bit streams for the image frame.

22. The method of claim 21 wherein the receiving parameters includes the user specified target frame size from a video input.

23. The method of claim 21 wherein the receiving parameters includes historical data, maximum frame size, final quantization parameter (QP) and/or estimated QP that are fed back from a PAK hardware (HW) component.

24. The method of claim 21 wherein calculating a mismatch provides a quantization parameter (QP) delta that is used as a basis for searching the corresponding value in the LUT.

25. The method of any of claims 21 to 24 wherein applying the corresponding value is performed in at least one or more iterations until the mismatch is corrected.

26. The method of any of claims 21 to 24 wherein applying the corresponding value is performed during iterations until a maximum pass for a given frame type is obtained.

27. The method of any of claims 21 to 24 wherein applying the corresponding value is performed in at least one or more iterations that includes re-encoding of the image frame in case of mismatch presence.

28. The method of any of claims 21 to 24 wherein applying the corresponding value includes applying a different quantization parameter (QP) to the current frame size.

29. The method of any of claims 21 to 24 wherein the transmitting bit streams is implemented in a single passing, the bit-streams represent sequence and/or combination of the intra (I) frame, predictive (P) frame, and/or the bidirectional (B)-frame encoding approaches.

30. The method of any of claims 21 to 24 wherein the transmitting bitstreams integrates sequence of the intra (I) frame, predictive (P) frame, and/or bidirectional (B) frame encoding approaches with the parameters that are derived after final iteration.

* * * * *